United States Patent Office 3,732,277
Patented May 8, 1973

3,732,277
1-(2'-CYANO-PHENOXY)-2-HYDROXY-3-ETHYL-
AMINO-PROPANE AND SALTS THEREOF
Herbert Köppe and Karl Zeile, Ingelheim am Rhein, and
Werner Traunecker, Munster-Sarmsheim, Germany, assignors to Boehringer Ingelheim G.m.b.H., Ingelheim am Rhein, Germany
No Drawing. Filed Aug. 3, 1970, Ser. No. 60,749
Int. Cl. C07c 121/78
U.S. Cl. 260—465 E     2 Claims

ABSTRACT OF THE DISCLOSURE 1-(2'-cyano-phenoxy) - 2 - hydroxy-3-ethylamino-propane of the formula

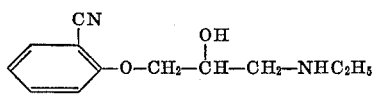

and non-toxic, pharmacologically acceptable acid addition salts thereof; the compounds are useful as β-adrenergic receptor blocking agents in warm-blooded animals.

---

This invention relates to the novel compound 1-(2'-cyano-phenoxy)-2-hydroxy-3-ethylamino-propane of the formula

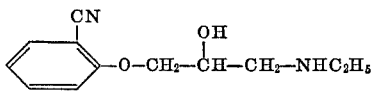 (I)

and non-toxic, pharmacologically acceptable acid addition salts thereof, as well as to various methods of preparing these compounds.

The compound of the Formula I according to the present invention may be prepared by a number of methods involving well known chemical principles, among which the following have proved to be particularly convenient and efficient.

Method A

By reacting a compound of the formula

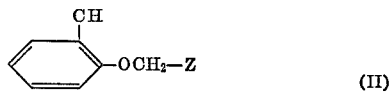 (II)

wherein Z is

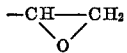

or —CHOH—CH$_2$—Hal, where Hal is halogen, with N,N'-diethylurea of the formula

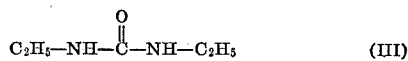 (III)

whereby the compound of the Formula I is formed in a single reaction step.

The reaction is preferably performed in a high-boiling-point, inert organic solvent, such as Tetralin, Decalin, benzo-nitrile, paraffin oil or chlorinated aromatic hydrocarbons, or without a solvent in the molten state, at temperatures between 150 and 220° C., preferably at 180–200° C.

Method B

By reacting a compound of the Formula II with ethylamine under reaction conditions conventional for such reactions.

Method C

By reacting 1-(2'-cyano-phenoxy)-2-hydroxy-3-amino-propane of the formula

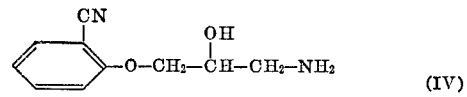 (IV)

with an electrophilic compound of the formula $$C_2H_5—X \quad (IVa)$$

wherein X is a radical which is easily removable as an anion, such as halogen, sulfate, alkylsulfonyl or arylsulfonyl.

Method D

By splitting off an easily removable protective group from a compound of the formula

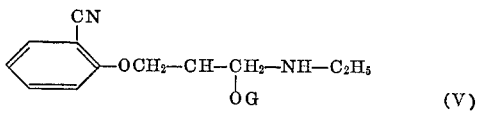 (V)

wherein G is a hydrolytically easily removable group, such as an acyl or an acetal group.

Method E

By hydrolysis of 3-ethyl-5-(2'-cyano-phenoxymethyl)-oxazolidinone-(2) of the formula

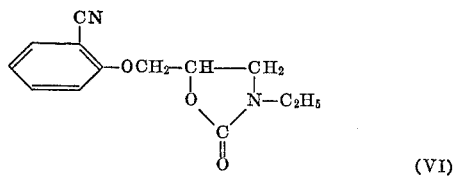 (VI)

for example, with a strong alkali in an aqueous or aqueous-alcoholic medium.

Method F

By hydrolysis or pyrolysis of a urea derivative of the formula

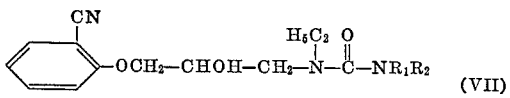 (VII)

wherein R$_1$ and R$_2$, which may be identical to or different from each other, are each hydrogen or alkyl (preferably lower alkyl), aralkyl (preferably benzyl), or aryl (preferably phenyl), in conventional fashion. The hydrolysis is carried out, for instance, with a strong base, such as aqueous KOH; the pyrolysis can also be performed without a catalyst.

Method G

By splitting off a protective group from a tertiary amine of the formula

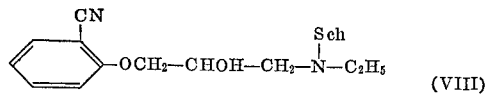 (VIII)

wherein Sch represents a hydrolytically easily removable amino-protective group, such as acyl.

Method H

By converting a compound of the formula

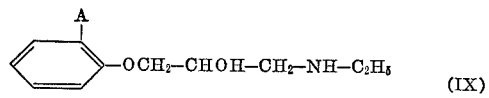 (IX)

wherein A is a group convertible by conventional methods into —CN; such as the —CH=NOH group (converts by dehydration into the cyano group), a halogen atom (converts by reaction with Cu(I)CN and pyridine at elevated temperatures into the cyano group), or an amino group (converts by diazotization and heating with copper(I)- cyanide into the cyano group), into the compound of the Formula I, by using the conventional methods required for each case (dehydration, heating with Cu(I)CN and pyridine, or diazotization and heating with Cu(I)CN).

Some of the starting materials required for methods A through H are known, while the others may be obtained according to the conventional processes, most often starting from 1-(2'-cyanophenoxy)-2,3-epoxy-propane. This epoxy compound, embraced by Formula II, may be prepared by reacting 2-hydroxy-benzonitrile with epichlorohydrin in the presence of sodium hydroxide, and may be converted into a halohydrin of the Formula II by reaction with the corresponding halohydric acid.

The compound of the Formula IV may be prepared from an epoxide of the Formula II by reaction with potassium phthalimide and subsequent hydrazine-cleavage (Gabriel-synthesis).

A compound of the Formula V may be obtained by reacting a halohydrin of the Formula II with a compound which forms the protective group G, such as an acyl halide, a vinyl ether or dihydropyran, and subsequently reacting the obtained compound of the formula

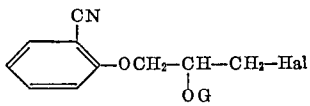

wherein Hal and G have the meanings previously defined, with ethyl amine.

The oxazolidinone of the Formula VI may, for example, be prepared by reacting 1-(2'-cyano-phenoxy)-2,3-epoxypropane with N-ethyl-methane (obtainable from ethyl chloroformate and ethylamine) in the presence of lithium hydroxide.

A urea derivative of the Formula VII may, for instance, be obtained according to the method described in Chem. Abstr. 58, page 3337c, by reacting an epoxide of the Formula II with the corresponding urea derivative, or by reacting a compound of the Formula V with a corresponding isocyanic acid derivative, and subsequently splitting off the protective group G.

A compound of the Formula VIII is obtained by reacting 1-(2'-cyano-phenoxy)-2,3-epoxy-propane with an amine of the formula

wherein Sch has the same meanings as in Formula VIII; or by reacting a compound of the formula

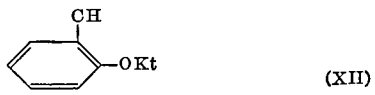

wherein Kt is hydrogen or a cation (for example, an alkali metal cation), with a compound of the formula

wherein Z and Sch have the meanings previously defined.

The compounds of the Formula IX already comprise the 1-phenoxy-2-hydroxy-3-ethylaminopropane structure and may, therefore, be prepared analogous to method B described above, starting from the corresponding phenol or phenolate, via the substituted 1-phenoxy-2,3-epoxy-propane (producible therefrom by reaction with epichlorohydrin in alkaline solution) by reaction with ethylamine.

The 1-(2'-amino-phenoxy)-2-hydroxy-3-ethylamino-propane required for the diazotization and subsequent reaction with Cu(I)CN, is prepared by reduction of 1-(2-nitrophenoxy)-2-hydroxy-3-ethylamino-propane which, in turn, is obtainable from 1-(2'-nitro-phenoxy)-2,3-epoxypropane and ethylamine. The last-mentioned epoxide may readily be obtained by reacting o-nitro-phenol with epichlorohydrin in alkaline solution.

The compound of the Formula I according to the present invention comprises an asymmetric carbon atom in the CHOH-group and therefore occurs as a racemate as well as in the form of optical antipodes. The latter may be obtained not only by means of separation of racemates wtih the usual auxiliary acids, such as dibenzoyl-D-tartaric acid or D-3-bromo-camphor-8-sulfonic acid, but also by using the corresponding optically active starting material.

The compound of the Formula I according to the invention may be converted into non-toxic, pharmaceutically acceptable acid addition salts in conventional fashion. Examples of such salts are, for instance, those formed with hydrochloric acid, hydrobromic acid, sulfuric acid, methanesulfonic acid, maleic acid, acetic acid, oxalic acid, lactic acid, tartaric acid, 8-chlorotheophylline or the like.

The following examples further illustrate the present invention and will enable others skilled in the art to understand it more completely.

EXAMPLE 1

A mixture consisting of 4.23 gm. (0.02 mol) of 1-(2'-cyano - phenoxy)-2-hydroxy-3-chloro-propane, 4.6 gm. (0.04 mol) of N,N'-diethyl-urea and 20 ml. of tetra-hydronaphthalene was heated for thirty minutes at 195–200° C. Thereafter, the reaction mixture was allowed to cool, was then diluted with ether and extracted twice with 10 ml. of 1 N hydrochloric acid each. The combined acid aqueous phases were washed once with ether and then made alkaline with sodium hydroxide. The oil which was precipitated thereby was taken up in ether, and the ethereal solution was washed with water, dried with magnesium sulfate and evaporated. The residue was recrystallized from ethylacetate/petroleum ether, and the base thus obtained, 1-(2'-cyano-phenoxy)-2-hydroxy-3-ethylamino-propane, was converted into its hydrochloride by addition of ethereal hydrochloric acid. After recrystallization from ethanol/ether, the hydrochloride had a melting point of 132–134° C.

EXAMPLE 2

17.5 gm. (0.1 mol) of 1-(2'-cyano-phenoxy)-2,3-epoxypropane were dissolved in 100 ml. of methanol, and 40 ml. of a methanolic about 50% solution of ethylamine were added. The mixed solution was refluxed for three hours on a water bath, and then the methanol was distilled off and the residue was digested with hydrochloric acid. After filtering off insoluble components, the acid filtrate was made alkaline with sodium hydroxide, extracted with ether, and the organic phase was dried over magnesium sulfate. The ether was distilled off, and the solid residue was recrystallized from ethylacetate by addition of petroleum ether. The base thus obtained was dissolved in ethanol, and the solution was acidified with ethereal hydrochloric acid, whereupon a colorless crystalline substance separated out. 7.7 gm. of 1-(2'-cyano-phenoxy)-2-hydroxy - 3 - ethylamino-propane hydrochloride, M.P. 134–135° C., were obtained.

EXAMPLE 3

1.14 gm. (0.005 mol) of 1-(2'-cyano-phenoxy)-2-hydroxy-3-amino-propane hydrochloride were dissolved in 2 ml. of water, and 1.06 gm. (0.01 mol) of sodium carbonate was added to the solution. Thereafter, 12 ml. of ethanol and 1.08 gm. (0.01 mol) of ethyl bromide were added, and the mixture was refluxed, accompanied by stirring. After one hour of refluxing the reaction had substantially gone to completion. The reaction solution was evaporated in vacuo, and the residue was chromatographed on a silica-gel column, using a mixture of 70 parts ethyl acetate, 30 parts isopropanol and 10 parts ammonia as the flow agent. The purified base thus obtained was dissolved in ethanol and precipitated as its hydrochloride by acidification of the solution with ethereal hydrochloric acid. 1-(2'-cyanophenoxy)-2-hydroxy-3-ethylamino-propane hydrochloride, M.P. 134–135.5 C., was obtained.

EXAMPLE 4

1.08 gm. (0.03 mol) of 1-ethylamino-3-(2'-cyanophenoxy)-2-propanol tetrahydropyranyl ether oxalate were dissolved in 15 ml. of 1 N hydrochloric acid, and the solution was heated for 30 minutes on a boiling water bath. Thereafter, the solution was allowed to cool and was then made alkaline with aqueous 20% sodium hydroxide and the precipitated base was taken up in chloroform. The chloroform extract solution was washed with water dried over magnesium sulfate and evaporated. The residue, 1-(2'-cyano-phenoxy)-2-hydroxy-3-ethylamino-propane, was dissolved in ethanol, the solution was acidified with ethanolic hydrochloric acid, and ether was added to the acid solution. 300 gm. of the hydrochloride of the base, M.P. 130–132° C., crystallized out.

EXAMPLE 5

A mixture consisting of 4.92 gm. (0.02 mol) of 3-ethyl-5-(2'-cyano-phenoxy-methyl)-oxazolidinone-2, 5.6 gm. (0.1 mol) of potassium hydroxide, 12 ml. of water and 30 ml. of ethanol was refluxed for three hours, accompanied by stirring. Thereafter, the solvent was distilled off in vacuo, the residue was taken up in dilute hydrochloric acid, and the solution was washed twice with ether. The acid aqueous phase was made alkaline with sodium hydroxide, and the oil precipitated thereby was taken up in ether. The ethereal solution was washed with water, dried and evaporated, and the residue, 1-(2'-cyano-phenoxy)-2-hydroxy-3-ethylamino-propane, was taken up in ethanol. The resulting solution was acidified with ethanolic hydrochloric acid, and ether was added. 2.1 gm. of the hydrochloride of the base, M.P. 130°–133° C., crystallized out.

EXAMPLE 6

A mixture consisting of 3.05 gm. (0.01 mol) of N-isopropyl-N'-ethyl-N'-[2-hydroxy-3-(2'-cyano-phenoxy)-n-propyl]-urea, 20 ml. of tetrahyronaphthalene and 100 mgm. of lithium chloride was heated for 90 minutes at 200° C. on an oil bath. Thereafter, the reaction mixture was diluted with 30 ml. of ether and then extracted twice with 15 ml. of 1 N hydrochloric acid each. The combined acid aqueous extracts were made alkaline with sodium hydroxide, and the oil precipitated thereby was taken up in ether. The ethereal solution was washed with water, dried and evaporated, the residue was dissolved in ethanol, the resulting solution was acidified with ethanolic hydrochloric acid, and ether was added. The hydrochloride of 1-(2'-cyano-phenoxy)-2-hydroxy-3-ethyl-amino-propane, M.P. 130–133.5° C., crystallized out.

EXAMPLE 7

A mixture of 3.9 gm. (0.015 mol) of 1-(2'-cyano-phenoxy)-2-hydroxy-3-(N-ethyl-N-acetyl-amino)-propane and 40 ml. of 0.5 N ethanolic potassium hydroxide was refluxed for two hours, accompanied by stirring. Thereafter, the reaction mixture was cooled and then acidified with aqueous 20% hydrochloric acid, and the solvent was distilled off in vacuo. The residue was admixed with water, and the aqueous mixture was extracted twice with ether. The aqueous phase was made alkaline with sodium hydroxide, the oil precipitated thereby was taken up in ether, and the resulting solution was washed with water, dried and evaporated. The residue was dissolved in ethanol, the solution was acidified with ethanolic hydrochloric acid, and ether was added. The hydrochloride of 1-(2'-cyanophenoxy)-2-hydroxy-3-ethylamino-propane, M.P. 131–133° C., crystallized out.

EXAMPLE 8

2.2 gm. (0.01 mol) of 1-(2'-amino-phenoxy)-2-hydroxy-3-ethylamino-propane were dissolved in a mixture of 6 ml. of concentrated hydrochloric acid and 20 ml. of water, and then a solution of 1.4 gm. (0.02 mol) of sodium nitrite in 5 ml. of water was added slowly dropwise, accompanied by stirring while maintaining the temperature, between 0 and +5° C. by exterior cooling (solution A).

A mixture of 5 gm. (0.02 mol) of $CuSO_4 \cdot 5H_2O$, 5.8 gm. (0.09 mol) of potassium cyanide and 30 ml. of water was heated to 75° C. while stirring (solution B).

The diazonium solution A was added dropwise to the hot Cu(I)CN solution B, and then the mixed solution was stirred for thirty minutes at 75° C. Thereafter, the reaction mixture was made alkaline with sodium hydroxide, extracted with chloroform, and insoluble components were filtered off. The combined chloroform phases were washed with water, dried with magnesium sulfate and evaporated, the residue was dissolved in acetonitrile, and the resulting solution was acidified with ethanolic hydrochloric acid. Upon cooling of the acidic solution, a crystalline substance separated out which was identified by thin-layer chromatography and melting point determination to be a side product, which was filtered off. The filtrate was admixed with ether, the crystalline precipiate formed thereby was collected and dissolved in ethanol, and ether was added. The crystalline precipitate formed thereby was identified to be pure 1-(2'-cyano-phenoxy)-2-hydroxy-3-ethylamino-propane hydrochloride, M.P. 129–132° C.

The compounds according to the present invention, that is, the compound of the Formula I above and its non-toxic, pharmacologically acceptable acid addition salts, have useful pharmacodynamic properties. More particularly, the compounds of the instant invention exhibit very effective $\beta$-adrenergic receptor blocking activities in warm-blooded animals, such as guinea pigs, and are therefore useful therapeutics for the treatment and prophylaxis of diseases of the coronaries and for the treatment of cardiac arrythmia, especially tachycardia.

For pharmaceutical purposes the compounds according to the present invention are administered to warm-blooded animals perorally or parenterally as active ingredients in customary dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. Such dosage unit compositions may, in addition to a compound of the present invention, also comprise an effective dosage unit of one or more compounds having a different pharmacodynamic property, such as a coronary dilator, a sympathomimetic, a cardiac glycoside and/or a transquilizer. One effective dosage unit of the compounds according to the present invention is from 0.0166 to 2.5 mgm./kg. body weight, preferably 0.083 to 0.84 mgm./kg. (perorally) or 0.0166 to 0.34 mgm./kg. (parenterally).

The following examples illustrate a few dosage unit compositions comprising a compound of the present invention as an active ingredient and represent the best modes contemplated of putting the invention into practical use. The parts are parts by weight unless otherwise specified.

EXAMPLE 9

Tablets

The tablet composition was compounded from the following ingredients:

| | Parts |
|---|---|
| 1-(2'-cyanophenoxy)-2-hydroxy-3-ethylamino-propane·HCl | 40.0 |
| Corn starch | 164.0 |
| Secondary calcium phosphate | 240.0 |
| Magnesium stearate | 1.0 |
| Total | 445.0 |

Preparation

The individual components were intimately admixed with each other, the mixture was granulated in customary fashion, and the granulate was compressed into 445 mgm.-tablets with a conventional tablet making machine. Each tablet contained 40 mgm. of the propanol salt, and, when administered perorally to a warm-blooded animal of about 60 kg. body weight in need of such treatment, produced a very effective β-adrenergic receptor blocking action.

EXAMPLE 10

Gelatin capsules

The capsule filler composition was compounded from the following ingredients:

| | Parts |
|---|---|
| (−)-1-(2′-cyanophenoxy) - 2 - hydroxy - 3 - ethyl-amino-propane·HCl | 25.0 |
| Corn starch | 175.0 |
| Total | 200.0 |

Preparation

The components were intimately admixed with each other, and 200 mgm.-portions of the mixture were filled into gelatin capsules of suitable size. Each capsule contained 25 mgm. of the propanol salt and, when perorally administered to a warm-blooded animal of about 60 kg. body weight in need of such treatment, produced a very effective β-adrenergic receptor blocking action.

EXAMPLE 11

| | Parts |
|---|---|
| 1-(2′-cyanophenoxy)-2-hydroxy - 3 - ethylamino-propane·HCl | 2.5 |
| Sodium salt of EDTA (ethylenediamine-tetra-acetic acid) | 0.2 |
| Distilled water, q.s.ad. | 100.0 |

Preparation

The propanol salt and the EDTA salt were dissolved in a sufficient amount of distilled water, and the solution was diluted to the desired volume with distilled water. The solution was filtered until free from suspended particles and filled into 1 cc. ampules under aseptic conditions. Finally, the ampules were sterilized and sealed. Each ampule contained 25 mgm. of the propanol salt, and when the contents thereof were intravenously administered to a warm-blooded animal of about 60 kg. body weight in need of such treatment, a very effective β-adrenergic receptor blocking action was produced.

EXAMPLE 12

Coated sustained release tablets

The tablet core composition was compounded from the following ingredients:

| | Parts |
|---|---|
| 1-(2′-cyanophenoxy)-2-hydroxy - 3 - ethylamino-propane·HCl | 25.0 |
| Carboxymethyl cellulose (CMC) | 295.0 |
| Stearic acid | 20.0 |
| Cellulose acetate phthalate (CAP) | 40.0 |
| Total | 380.0 |

Preparation

The propanol salt, the CMC and the stearic acid were intimately admixed with each other, and the mixture was granulated in customary fashion, using a solution of the CAP in 200 ml. of a mixture of ethanol and ethylacetate as the moistening agent. The granulate was then compressed into 380 mgm.-cores, which were coated in the usual way with an aqueous 5% solution of polyvinylpyrrolidone containing sugar. Each coated tablet contained 25 mgm. of the propanol salt and, when administered perorally to a warm-blooded animal of about 60 kg. body weight in need of such treatment, produced a very effective β-adrenergic receptor blocking action over an extended period of time.

EXAMPLE 13

Tablets with combination of active ingredients

The tablet composition was compounded from the following ingredients:

| | Parts |
|---|---|
| 1-(2′-cyanophenoxy)-2-hydroxy-3-ethylamino-propane·HCl | 35.0 |
| 2,6-bis-(diethanolamino)-4,8-dipiperidino-pyrimido-[5,4-d]-pyrimidine | 75.0 |
| Lactose | 164.0 |
| Corn starch | 194.0 |
| Colloidal silicic acid | 14.0 |
| Polyvinylpyrrolidone | 6.0 |
| Magnesium stearate | 2.0 |
| Soluble starch | 10.0 |
| Total | 500.0 |

Preparation

The propanol salt, the lactose, the corn starch, the colloidal silicic acid and the polyvinylpyrrolidone were intimately admixed with each other, and the mixture was granulated in the usual way, using an aqueous solution of the soluble starch as the moistening agent. The granulate was admixed with magnesium stearate, and the composition was compressed into 500 mgm.-tablets. Each tablet contained 35 mgm. of the propanol salt and 75 mgm. of the pyrimido-pyrimidine compound and, when perorally administered to a warm-blooded animal of about 60 kg. body weight in need of such treatment, produced very effective β-adrenergic receptor blocking and coronary dilating actions.

Analogous results were obtained when the compound of the Formula I or any other non-toxic acid addition salt thereof was substituted for the particular salt in Examples 9 through 13. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. Racemic or optically active 1-(2′-cyanophenoxy)-2-hydroxy-3-ethylamino-propane, or a non-toxic, pharmacologically acceptable acid addition salt thereof.
2. A compound according to claim 1, which is racemic or optically active 1-(2′-cyano-phenoxy)-2-hydroxy-3-ethylamino-propane hydrochloride.

References Cited

UNITED STATES PATENTS 3,459,782   8/1969   Hoppe et al. _____ 260—465
3,541,130   11/1970  Hoppe et al. _____ 260—465

LEWIS GOTTS, Primary Examiner

D. H. TORRENCE, Assistant Examiner

U.S. Cl. X.R.

260—253, 307 R, 348 R, 465 D, 465 F, 566 A, 570.7; 424—304

UNITED STATES PATENT OFFICE
CERTIFICATE OF CORRECTION

Patent No. 3,732,277    Dated May 8, 1973

Inventor(s) Herbert Koppe et al.

It is certified that error appears in the above-identified patent and that said Letters Patent are hereby corrected as shown below:

Col. 1, line 10 - insert

-- Claims priority, application Germany, August 8, 1969, P 19 40 566.4 --

Signed and sealed this 18th day of June 1974.

(SEAL)
Attest:

EDWARD M. FLETCHER, JR.
Attesting Officer

C. MARSHALL DANN
Commissioner of Patents